US006986874B2

(12) United States Patent
Satchell, Jr. et al.

(10) Patent No.: US 6,986,874 B2
(45) Date of Patent: Jan. 17, 2006

(54) METHOD AND APPARATUS FOR THE PRODUCTION OF NITROGEN TRIFLUORIDE

(75) Inventors: Donald Prentice Satchell, Jr., Berkeley Heights, NJ (US); Johannes Petrus le Roux, Pretoria (ZA)

(73) Assignee: The BOC Group, Inc., Murray Hill, NJ (US)

( * ) Notice: Subject to any disclaimer, the term of this patent is extended or adjusted under 35 U.S.C. 154(b) by 505 days.

(21) Appl. No.: 09/737,191

(22) Filed: Dec. 14, 2000

(65) Prior Publication Data

US 2002/0127167 A1 Sep. 12, 2002

(51) Int. Cl.
*C01B 21/083* (2006.01)

(52) U.S. Cl. ...................................... 423/406; 423/489

(58) Field of Classification Search ................ 423/406, 423/489, 483

See application file for complete search history.

(56) References Cited

U.S. PATENT DOCUMENTS

| | | | | |
|---|---|---|---|---|
| 4,001,380 | A | | 1/1977 | Gordon et al. |
| 4,091,081 | A | | 5/1978 | Woytek et al. |
| 4,156,598 | A | * | 5/1979 | Woytek et al. ........... 423/239.2 |
| 4,543,242 | A | | 9/1985 | Aramaki et al. |
| 4,804,447 | A | | 2/1989 | Sartori |
| 5,084,156 | A | | 1/1992 | Iwanaga et al. |
| 5,085,752 | A | | 2/1992 | Iwanaga et al. |
| 5,628,894 | A | | 5/1997 | Tarancon |
| 5,637,285 | A | | 6/1997 | Coronell et al. |
| 6,010,605 | A | | 1/2000 | Tarancon |
| 6,790,428 | B2 | * | 9/2004 | Tsirukis et al. ............. 423/483 |
| 2003/0017098 | A1 | * | 1/2003 | Ohno et al. ................. 423/406 |

* cited by examiner

*Primary Examiner*—Ngoc-Yen Nguyen
(74) *Attorney, Agent, or Firm*—David A. Hey

(57) ABSTRACT

The present invention provides a method and apparatus for producing nitrogen trifluoride. The method comprises contacting a fluorine-containing feed stream with liquid ammonium acid fluoride in a reaction zone for time and under conditions sufficient to produce nitrogen trifluoride. During the contacting step, the effective melt acidity value of the liquid ammonium acid fluoride is decreased and a reaction product stream is removed. In one embodiment, a gaseous mixture of elemental fluorine and hydrogen fluoride is contacted with a bulk liquid ammonium acid fluoride, such that the initial effective melt acidity value is greater than the melt acidity value of the bulk liquid ammonium acid fluoride in the reaction zone.

30 Claims, 3 Drawing Sheets

Estimated values of $c_1$, $c_2$, and $c_3$ as a function of melt acidity x value $NH_4F(HF)_x$ in batch experiments Nitrogen trifluoride yield as a function of the $NH_4F(HF)_x$ melt acidity x value with parameters of hydrogen fluoride partial pressure in the fluorine feed

METHOD AND APPARATUS FOR THE PRODUCTION OF NITROGEN TRIFLUORIDE

FIELD OF THE INVENTION

The present invention is directed to a process and apparatus for the production of nitrogen trifluoride and hydrogen fluoride from ammonia and elemental fluorine using an ammonium acid fluoride melt intermediate.

BACKGROUND OF THE INVENTION

Nitrogen trifluoride can be produced by the gas phase reaction of ammonia and fluorine. Reaction 1 illustrates the desired gas phase $NF_3$ production reaction.

$$3F_2(g)+NH_3(g)\rightarrow NF_3(g)+3HF(g)(\Delta H=-904\ \text{KJ/g mole } NF_3) \quad \text{Reaction 1}$$

wherein (g) denotes the gas phase. A solid catalyst is often used to lower the required operating temperature, which increases the $NF_3$ yield. However, it is very difficult to control the reactor temperature with this highly exothermic reaction. As a result, the gas phase ammonia and fluorine reaction produces substantial quantities of HF, $N_2$, $N_2F_2$, and $NH_4F$, with $NF_3$ yields typically substantially less than ten percent.

U.S. Pat. No. 4,091,081 teaches a higher-yield process that produces nitrogen trifluoride [$NF_3$] and by-product ammonium acid fluoride [$NH_4F(HF)x$] by contacting a molten ammonium acid fluoride [$NH_4F(HF)x$] with gaseous fluorine [$F_2$] and ammonia [$NH_3$]. U.S. Pat. No. 5,637,285 describes a similar process, wherein yield is further increased by utilizing a high level of mixing intensity and an ammonium acid fluoride having a $HF/NH_3$ molar ratio greater than 2.55 (equivalent to a melt acidity x value of greater than 1.55). However, the process described in the '285 patent is undesirable for several reasons. The process disclosed in the '285 patent produces an ammonium acid fluoride waste stream, thereby creating disposal problems. Further, it is difficult to maintain the $HF/NH_3$ molar ratio or x value of the bulk ammonium acid fluoride [$NH_4F(HF)x$] at the desired level. There remains a need in the art for a high yield process for producing nitrogen trifluoride without the above-mentioned drawbacks.

SUMMARY OF THE INVENTION

The present invention provides a method and apparatus for producing nitrogen trifluoride using an ammonium acid fluoride melt intermediate without requiring precise control of the melt acidity value. The present invention comprises contacting a fluorine-containing feed stream with liquid ammonium acid fluoride, for example having the acid-base stoichiometery $NH_4F(HF)_x$, wherein x is the melt acidity value, in a reaction zone for a time and under conditions sufficient to produce nitrogen trifluoride. During the contacting step, the effective melt acidity value of the liquid ammonium acid fluoride contacting the gaseous feed is decreased, while the bulk melt acidity value is held roughly constant. Preferably, the effective melt acidity value is decreased from a value above the optimum value resulting in the highest nitrogen trifluoride yield at the reaction zone operating conditions to approximately the optimum value. A reaction product stream comprising nitrogen trifluoride is removed from the reaction zone. In this manner, production of the undesirable by-product nitrogen is suppressed without sacrificing yield or requiring precise control of the bulk melt acidity x value at a single value.

One method of decreasing the effective melt acidity value during the contacting step is to contact the fluorine-containing feed stream with the liquid ammonium acid fluoride in a series of reactors, wherein each successive reactor contains ammonium acid fluoride having a progressively lower melt acidity value. In a preferred embodiment, the decreasing effective melt acidity value is accomplished by forming a gaseous mixture of elemental fluorine and hydrogen fluoride. The gaseous mixture is contacted with a bulk liquid ammonium acid fluoride in a reaction zone for a time and under conditions sufficient to produce nitrogen trifluoride. Due to the presence of the hydrogen fluoride in the gaseous feed, the initial effective melt acidity value in the reaction zone will be greater than the melt acidity value of the bulk liquid ammonium acid fluoride. In one embodiment, the initial effective melt acidity value is at least about 0.05 greater than the melt acidity value of the bulk liquid ammonium acid fluoride in the reaction zone, preferably at least about 0.1 greater, more preferably at least about 0.3 greater. The bulk liquid ammonium acid fluoride melt acidity value is preferably less than about 1.8, more preferably less than about 1.6.

In one embodiment, a reaction product stream comprising nitrogen trifluoride and entrained liquid ammonium acid fluoride is removed from the above-described reaction zone. The reaction product stream is preferably introduced into a regeneration zone, such as a separate stirred tank, wherein the operating pressure of the regeneration zone is lower than the operating pressure of the reaction zone, causing release of gaseous hydrogen fluoride from the entrained liquid ammonium acid fluoride. A regeneration product stream comprising nitrogen trifluoride and hydrogen fluoride may then be removed from the regeneration zone and introduced into a separation zone in order to separate the hydrogen fluoride from the nitrogen trifluoride. At least a portion of the hydrogen fluoride separated in the separation zone is preferably recycled and vaporized for use in the gaseous feed mixture to the reaction zone.

It is also preferable to recycle liquid ammonium acid fluoride from the regeneration zone to the reaction zone. In one embodiment, the flow rate of recycled liquid ammonium acid fluoride to the reaction zone is sufficient to counteract the highly exothermic heat of reaction of nitrogen trifluoride production. For example, it is desirable for the flow rate of the recycled ammonium acid fluoride to be at least about 1,000 times the stoichiometric flow rate required to react with the fluorine in the feed stream, more preferably at least about 2,000, or even at least about 2,500 times, the stoichiometric flow rate. The recycled liquid ammonium acid fluoride preferably passes through a gas-liquid separation tank in order to separate a gas phase from the liquid ammonium acid fluoride prior to recycling the ammonium acid fluoride to the reaction zone. The gas phase collected in the separation tank is combined with the regeneration product stream.

A makeup stream of ammonium acid fluoride can be introduced into the process of the present invention as needed. The makeup stream may be produced by reacting ammonia with hydrogen fluoride in a second reaction zone. Preferably, the makeup ammonium acid fluoride stream is introduced into the regeneration zone. In one embodiment, the makeup ammonium acid fluoride stream is contacted with the regeneration product stream, for example in a demister, in order to recover entrained ammonium acid fluoride from the regeneration product stream. Alternatively, ammonia may be fed directly to the first reaction zone to produce the ammonium acid fluoride.

The present invention also provides an apparatus for producing nitrogen trifluoride. The apparatus may include a supply of a gaseous mixture of elemental fluorine and hydrogen fluoride and a first reactor in fluid communication with the gaseous mixture supply. The reactor preferably comprises a reaction zone and an outlet, wherein the reaction zone is operatively positioned to contact the gaseous mixture with a bulk liquid ammonium acid fluoride. The apparatus may further include a regenerator in fluid communication with the outlet of the first reactor and comprising a regeneration zone and a product outlet. The regeneration zone is operatively positioned to separate a regeneration product stream comprising nitrogen trifluoride and hydrogen fluoride from liquid ammonium acid fluoride. The apparatus may further include a separator in fluid communication with the product outlet of the regenerator. The separator comprises a gaseous outlet and a liquid outlet, wherein the separator is operatively positioned to separate hydrogen fluoride in liquid form from gaseous nitrogen trifluoride.

BRIEF DESCRIPTION OF THE DRAWINGS

Figure 1:
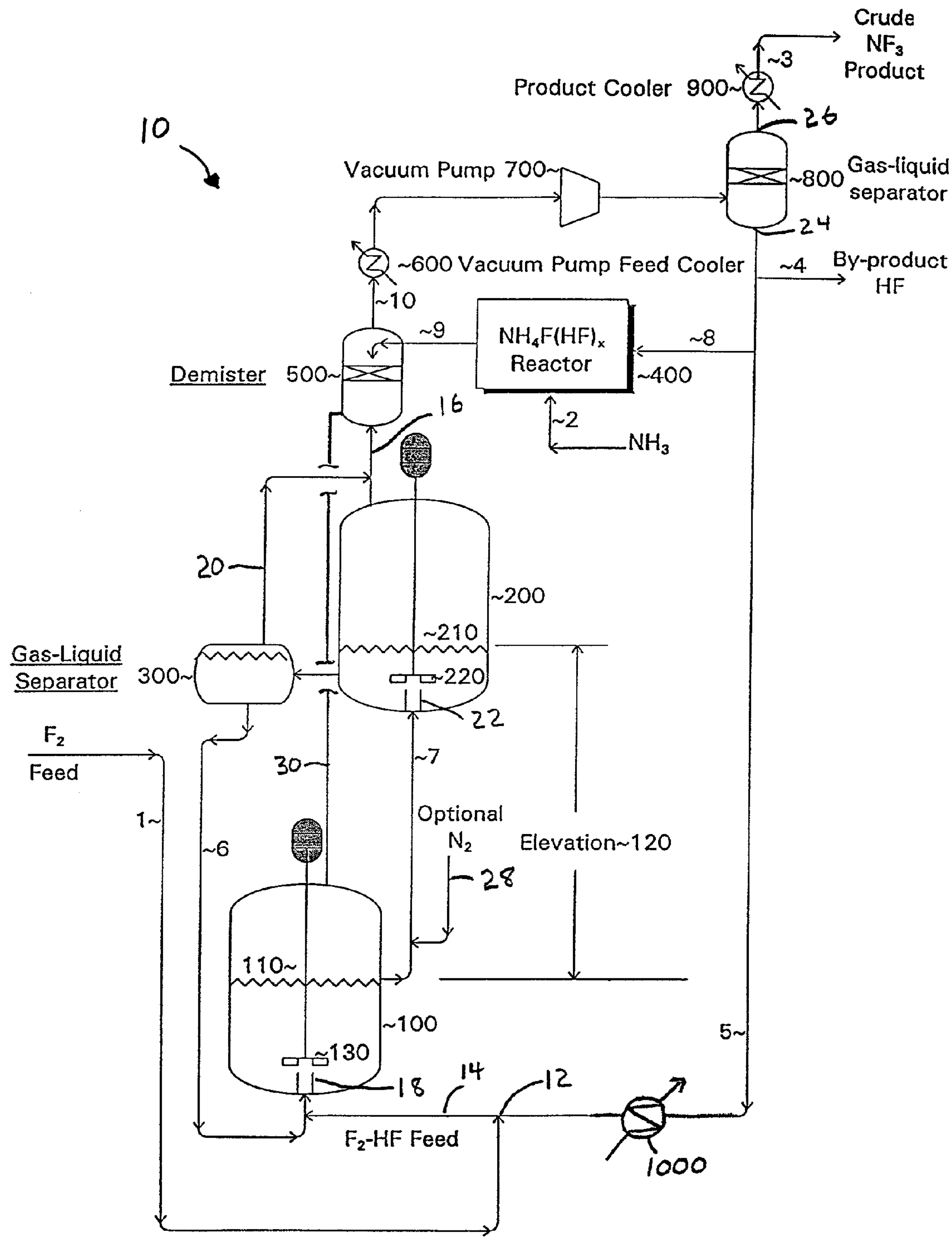
Figure 2:
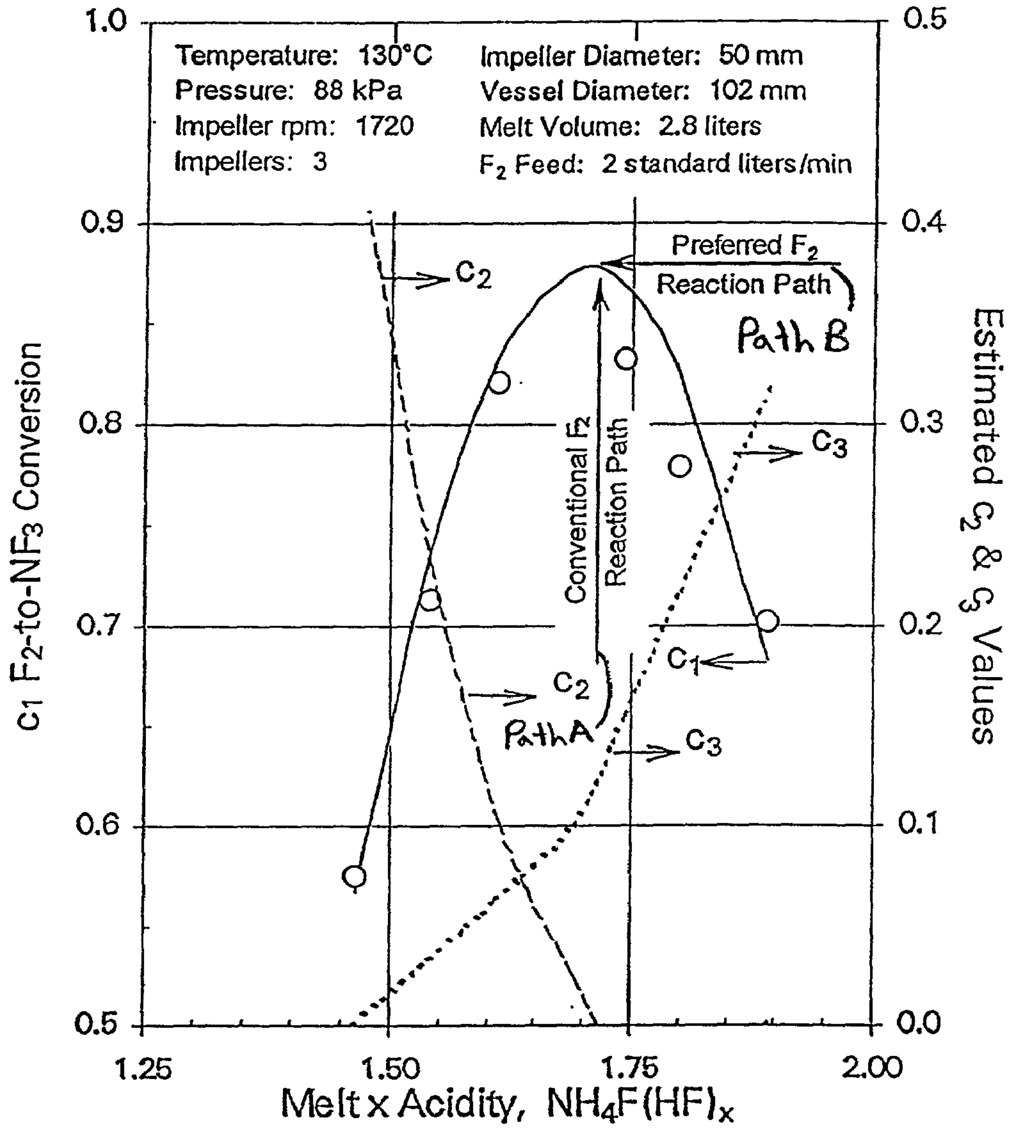
Figure 3:
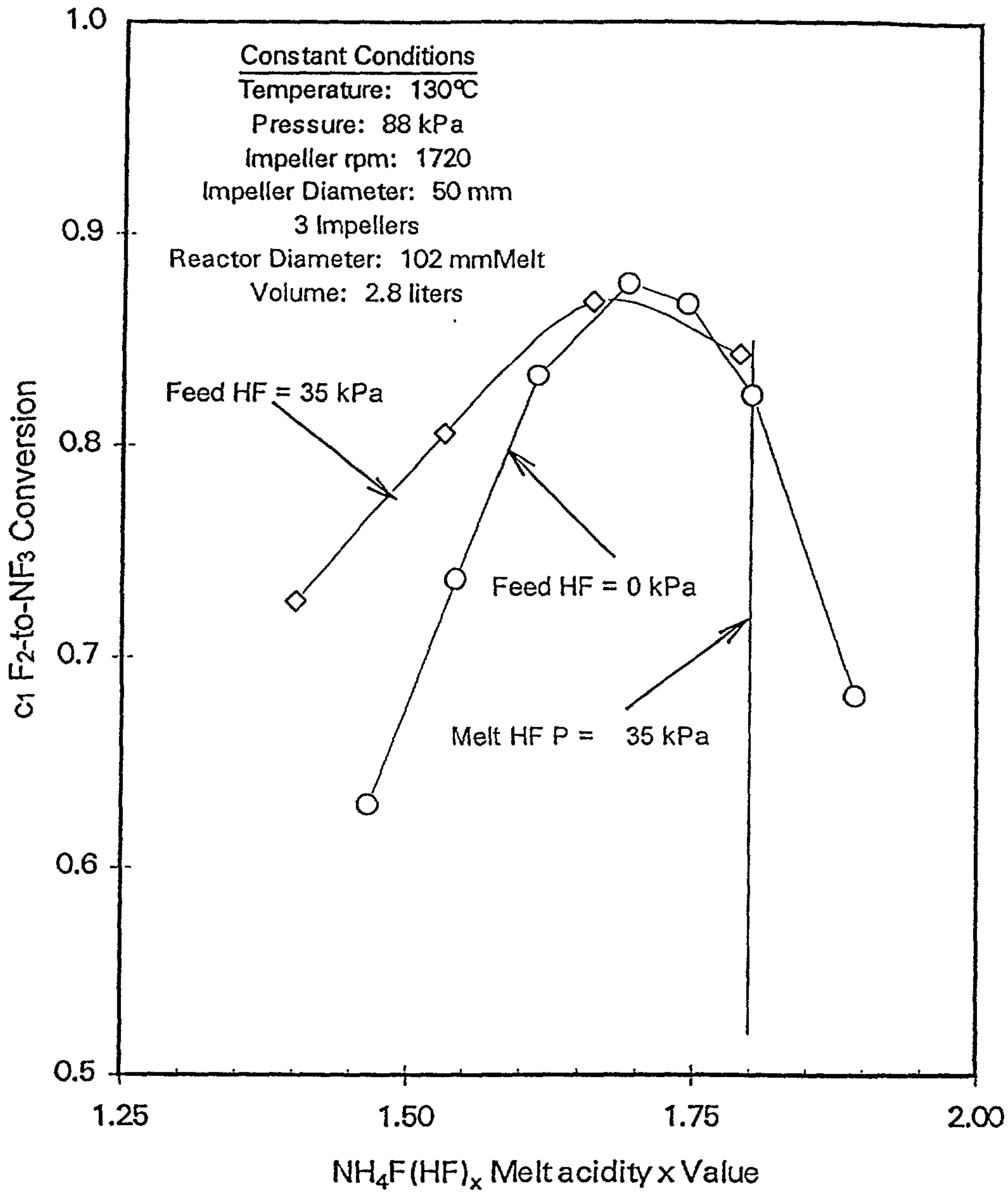

Having thus described the invention in general terms, reference will now be made to the accompanying drawings, which are not necessarily drawn to scale, and wherein:

FIG. 1 is a process flow diagram of an embodiment of the apparatus of the present invention;

FIG. 2 is a plot of the estimated $F_2$ reaction distribution ($c_1$, $c_2$, and $c_3$) as a function of the $NH_4F(HF)_x$ melt acidity x value in batch bench scale experiments; and FIG. 3 is a plot of the nitrogen trifluoride yield as a function of the $NH_4F(HF)_x$ melt acidity x value at different hydrogen fluoride partial pressures in the fluorine feed.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As used herein, the term “ammonium acid fluoride” includes all ammonium poly(hydrogen fluoride) complexes and ammonium fluorometallate poly(hydrogen fluoride) complexes. The ammonium acid fluoride compositions can be generically described by the acid-base stoichiometry of $NH_4M_yF_z(HF)_x$, wherein M is a metal selected from the group consisting of Group IA through VA, Group IB through VIIB and Group VIII of the Periodic Table of Elements or mixtures thereof; y is typically 0–12; z is typically 1–12 and is chosen to maintain the charge neutrality of the complex; and x is the melt acidity value. In a preferred embodiment, y is 0 and z is 1, thus yielding a complex with an acid-base stoichiometry of $NH_4F(HF)_x$. However, other ammonium acid fluoride complexes may be used without departing from the present invention.

A simplified description of the $NF_3$ production process chemistry involved in the present invention is given below. The ammonium acid fluoride melt intermediate, $NH_4F(HF)_x$, wherein x is the melt acidity value, is typically formed by the reaction of gaseous ammonia with either gaseous HF via Reaction 2 below or $NH_4F(HF)_x$ melt via Reaction 3 below.

$$NH_3(g)+(1+x)HF(g) \rightarrow NH_4F(HF)_x(l) \quad \text{Reaction 2}$$

$$NH_3(g)+\alpha NH_4F(HF)_{x+(x+1)/\alpha}(l) \rightarrow (\alpha+1)NH_4F(HF)_x(l) \quad \text{Reaction 3}$$

wherein (l) denotes a species in the liquid phase.

The ammonium acid fluoride product from either Reaction 2 or 3 can react with a gaseous fluorine feed to produce the desired nitrogen trifluoride product via Reaction 4 below.

$$3c_1F_2(g)+c_1(\alpha+1)NH_4F(HF)_x(l) \rightarrow c_1NF_3(g) +\alpha c_1NH_4F(HF)_x(l)+c_1(4+x)HF(l) \quad \text{Reaction 4}$$

wherein $c_1$ is the fraction of the $F_2$ feed that reacts to produce $NF_3$ and $\alpha$ is the ratio of the $NH_4F(HF)_x(l)$ product rate to its stoichiometric feed rate. The major competing reaction, Reaction 5 below, produces $N_2$ rather than $NF_3$.

$$3c_2F_2(g)+c_2(\alpha+2)NH_4F(HF)_x \rightarrow c_2N_{2+\alpha c2}NH_4 F(HF)_x+c_2(8+2x)HF(l) \quad \text{Reaction 5}$$

wherein $c_2$ is the fraction of the $F_2$ feed that reacts to produce $N_2$. Alternatively, $F_2$ could pass through the $NF_3$ reactor without reacting as shown below in Reaction 6.

$$c_3F_2(g) \rightarrow c_3F_2(g) \quad \text{Reaction 6}$$

wherein $c_3$ is the fraction of the $F_2$ feed that does not react. The above analysis assumes that Reactions 4 to 6 describe all the fluorine reactions ($c_1+c_2+c_3=1$).

The HF by-product may be removed from the $NH_4F(HF)_x$ melt by vaporization via Reaction 7.

$$c_1(4+x)HF(l)+c_2 (8+2x)HF(l) \rightarrow c_1(4+x)HF(g)+c_2 (8+2x)HF(g) \quad \text{Reaction 7}$$

FIG. 2 is a plot of the estimated $F_2$ reaction yield distribution ($c_1$, $c_2$, & $c_3$) in bench scale batch $NF_3$ experiments at a given set of process parameters. This analysis indicates that, for $NH_4F(HF)_x$ melt acidity values less than the optimum value (i.e. less than the melt value resulting in the highest yield of $NF_3$), Reaction 5 is primarily responsible for inferior $NF_3$ conversion. For $NH_4F(HF)_x$ melt acidity values greater than the optimum value, unreacted $F_2$ (Reaction 6) is primarily responsible for inferior $NF_3$ conversion.

FIG. 2 also illustrates the conventional $F_2$ reaction path A and the preferred $F_2$ reaction path B. In the approach described in U.S. Pat. No. 5,637,285, fluorine is contacted with the $NH_4F(HF)_x$ melt in either a single bubble column or a single stirred tank. Both types of reactors operate at essentially a single $NH_4F(HF)_x$ acidity level, such that the $F_2$ feed is converted to $NF_3$ in the presence of a constant melt acidity value, as shown by path A. In contrast, the preferred reaction path B initially contacts the fluorine gas with a $NH_4F(HF)_x$ melt having an acidity x value greater than optimum value, which would result in lower fluorine reaction rates, but higher $NF_3$ selectivity, and then subsequently contacts the fluorine with $NH_4F(HF)_x$ melts having progressively lower x acidity values to obtain progressively higher $F_2$ reaction rates with only modest decreases in the $NF_3$ selectivity. With this approach, one could achieve near optimum $NF_3$ conversion without precise knowledge of either the optimum $NH_4F(HF)_x$ melt acidity value or careful control of the bulk $NH_4F(HF)_x$ melt acidity x value.

The present invention provides an efficient method and apparatus for the production of nitrogen trifluoride that utilizes an ammonium acid fluoride intermediate without requiring strict maintenance of the melt acidity value of the bulk ammonium acid fluoride at an optimum setpoint. In the method of the present invention, a fluorine-containing feed stream is contacted with a liquid ammonium acid fluoride, such as $[NH_4F(HF)_x]$, wherein x is the melt acidity value, in a reaction zone for a time and under conditions sufficient to produce nitrogen trifluoride. In order to better emulate the above-described reaction path B, the effective melt acidity x value of the liquid ammonium acid fluoride in contact with the fluorine-containing feed stream is decreased during the contacting step. The "effective melt acidity x value" of the liquid ammonium acid fluoride in contact with the fluorine-containing gas bubbles is the melt acidity value that would be in equilibrium with the hydrogen fluoride (HF) partial pressure in the fluorine-containing gas bubbles at the reactor operating conditions (i.e. the reactor temperature and pressure). Preferably, the decreasing step comprises decreasing the effective melt acidity value of the liquid ammonium acid fluoride from a value above the optimum value resulting in the highest nitrogen trifluoride yield at reaction zone conditions to approximately the optimum value. The initial effective melt acidity value is at least about 0.05 greater than the melt acidity value of the bulk liquid ammonium acid fluoride in the reaction zone, preferably at least about 0.1 greater or at least about 0.3 greater. For example, in one embodiment, the acidity value is decreased from an initial value of about 1.8 to about 2.0 to a lower value of about 1.6 to about 1.8.

In one embodiment, the contacting step occurs in a series of reactors or stages, such as stirred tanks or bubble columns, wherein each successive reactor contains ammonium acid fluoride having a progressively lower bulk melt acidity x value. In this embodiment, the fluorine-containing gas is preferably contacted with the ammonium acid fluoride in counter-current flow. As the fluorine-containing gaseous stream leaves a first reactor or stage, the HF partial pressure in the fluorine-containing stream is in equilibrium with the bulk melt acidity x value of the ammonium acid fluoride of the first stage. As a result, the initial effective melt acidity x value of the ammonium acid fluoride in the second stage will be higher than the bulk melt acidity x value of the second stage and so on.

In a preferred embodiment requiring only a single reaction stage, hydrogen fluoride [HF] is added to the elemental fluorine feed, so that, as the gaseous feed mixture initially contacts the liquid bulk ammonium acid fluoride in the reaction zone, the effective melt acidity x value is greater than the bulk ammonium acid fluoride melt acidity x value. The effective melt acidity value of the liquid ammonium acid fluoride in contact with the fluorine-containing gas bubbles decreases as the gas bubbles pass through the reaction zone. As noted above, the effective melt acidity x value of the liquid ammonium acid fluoride in contact with the fluorine-containing gas bubbles is the melt acidity value that would be in equilibrium with the HF partial pressure in the gas bubble at the reactor operating conditions. The initial effective melt acidity x value as the bubble enters the reaction zone is the melt acidity x value that would be in equilibrium with the HF partial pressure in the fluorine-containing feed stream to the reaction zone. By the time the gas bubble exits the reaction zone, the HF partial pressure of the gas bubble is essentially in equilibrium with the bulk melt acidity value. Therefore, the effective melt acidity x value and the bulk melt acidity value are roughly equal as the gas bubble exits the reaction zone. The melt acidity x value of the bulk ammonium acid fluoride is defined as the acidity value of the bulk volume of ammonium acid fluoride contained in the reaction zone. Since the ammonium acid fluoride is typically well-mixed within the reaction zone, the bulk acidity value can be assumed to be uniform throughout the reaction zone. The reaction zone is defined as the site in which the ammonium acid fluoride and the fluorine-containing feed are contacted under conditions capable of producing nitrogen fluoride.

In essence, the addition of hydrogen fluoride to the reactor feed allows each gaseous feed bubble to travel along the preferred reaction path B shown in FIG. 2. For example, as each $F_2$—HF bubble passes through a bulk ammonium acid fluoride melt having a melt acidity value at or slightly below the optimum level, the effective melt acidity value is initially at or above the optimum acidity value, and then declines as the bubble interacts with the ammonium acid fluoride. By the time the fluorine-containing bubble leaves the reaction zone, the hydrogen fluoride partial pressure within the bubble is essentially in equilibrium with the bulk ammonium acid fluoride melt acidity value. As a result, the effective melt acidity value and the bulk melt acidity value for a bubble leaving the reaction zone are essentially equal.

Equation E1 provides a useful estimate of the effective $NH_4F(HF)_x$ melt acidity x value for a hydrogen fluoride and elemental fluorine containing feed gas.

$$\text{Log}P = \frac{\left[\frac{x-1}{x}\right] - 0.5559 + 6.642x10^{-3}t}{0.1620 + 1.147x10^{-3}t} \qquad \text{Equation E1}$$

wherein t is the $NH_4F(HF)_x$ melt temperature in ° C., x is melt acidity value, and P is the hydrogen fluoride vapor pressure in mm Hg. One complicating factor is that the actual hydrogen fluoride partial pressure can be a significant function of other reactor zone operating conditions, particularly water content. The hydrogen fluoride partial pressure dramatically decreases with small increases in the ammonium acid fluoride water content. Despite this and other similar limitations, practical experience shows that Equation E1 provides reliable guidance for setting the hydrogen fluoride partial pressure in the elemental fluorine containing feed gas. As noted above, the HF partial pressure in the fluorine feed is set such that the initial effective melt acidity x value of the ammonium acid fluoride is greater than the measured bulk ammonium acid fluoride melt acidity x value.

An embodiment of the apparatus 10 of the present invention is illustrated in FIG. 1. As noted therein, a feed stream 1 containing elemental fluorine is fed into reactor 100. The feed flux of stream 1 is typically between about 0.01 and about 0.05 cubic meters per square meter of tank cross-sectional area per second. As noted schematically in FIG. 1, the fluorine containing gaseous feed stream 1 is mixed with a gaseous hydrogen fluoride stream at mixing point 12. Typically, a recycled liquid hydrogen fluoride stream 5 is vaporized using heater 1000 prior to mixing with the fluorine containing feed stream 1. The resulting gaseous mixture 14 of fluorine and hydrogen fluoride is then directed into reactor 100. Preferably, the partial pressure of hydrogen fluoride in the gaseous feed mixture 14 is at least about 15 kPa (equivalent to an effective ammonium acid fluoride melt acidity x value of at least about 1.49), more preferably at least about 25 kPa (equivalent to an effective ammonium acid fluoride melt acidity value of at least about 1.67), at a reactor 100 operating temperature of 130° C. In one embodiment, the HF partial pressure in the feed stream 14 is about 15 to about 60 kPa, preferably about 30 to about 50 kPa at the operating conditions of the reactor 100.

A recycled ammonium acid fluoride [$NH_4F(HF)_x$] stream 6 is also directed into reactor 100. As shown, although not required, the gaseous feed mixture 14 may be combined with the recycled stream 6 prior to entry into the reactor 100. In this embodiment, the "reaction zone" will include the portion of the piping leading into the reactor 100 after the two streams are mixed. Alternatively, the two streams, 6 and 14, could enter the reactor 100 at separate locations. The recycled ammonium acid fluoride stream 6 preferably enters the reactor 100 at a flow rate at least about 1000 times greater than the stoichiometric feed rate, more preferably at least about 2000 times the stoichiometric feed rate, and most preferably greater than about 2500 times the stoichiometric feed rate.

In one embodiment, the ammonium acid fluoride melt entering reactor 100 has a bulk melt acidity value of less than about 1.8, more preferably less than about 1.6. In one embodiment, the bulk melt acidity value in the reactor 100 is about 1.5 or less. As explained above, the presence of the hydrogen fluoride in the gaseous feed stream 14 causes the initial effective melt acidity value of the liquid ammonium acid fluoride contacting the gaseous feed to be higher than the acidity value of the bulk melt material in the reactor 100. Preferably, the initial effective melt acidity value is at least about 0.05 greater than the melt acidity value of the bulk ammonium acid fluoride in the reactor 100, more preferably at least about 0.1 greater or at least about 0.3 greater.

Since nitrogen trifluoride yield increases with decreasing temperature until the melting point of the ammonium acid fluoride melt is approached, it is advantageous to operate the reactor 100 at lower temperatures and minimize temperature gradients. Despite the very high exothermic heat of reaction involved in the production of nitrogen trifluoride, the maximum temperature rise in the reactor 100 can be limited to no more than about 4–5° C. by using a high ammonium acid fluoride stream 6 flow rate. In addition, the reactor 100, the regenerator 200 (discussed below) and the interconnecting piping, provide ample surface area for removal of excess heat from the apparatus 10. Further, if the interconnecting piping between the reactor 100 and regenerator 200 is sized appropriately, the recycled stream 6 flow rate is roughly proportional to the fluorine-containing feed stream 1 flow rate, which, in turn, is roughly proportional to the heat of reaction. Thus, the maximum temperature rise in the reactor 100 will only increase modestly, if at all, with increasing fluorine feed stream 1 flow rate.

The reactor 100 is preferably a stirred tank reactor, although other reactor configurations known in the art, such as bubble columns, may be used. In a preferred embodiment, the reactor 100 includes a turbine or other stirring device known in the art as useful for agitating gas-liquid mixtures. As shown, in one embodiment, the stirring device includes an aeration impeller 130 and a riser 18 to direct the feed streams into the impeller. The power input to the turbine or other stirring device is preferably greater than about 1 kilowatt per cubic meter of ammonium acid fluoride melt, more preferably greater than about 5 kilowatts per cubic meter of melt. The ammonium acid fluoride melt depth in the reactor 100 is preferably greater than about one meter, more preferably greater than about two meters. The reactor 100 preferably operates at a pressure of about 80 to about 200 kPa and a temperature of about 120 to about 150° C.

In one embodiment, a gaseous product bypass line 30 extends from the top of reactor 100 to demister 500 described below or to an intermediate point in between the reactor 100 and the regenerator 200. The primary purpose of the bypass line 30 is to have the capability to purge the reactor 100 prior to reactor shutdown. In addition, the flow rate in the bypass line 30 can be used, during normal reactor operations, to decrease the recycle ammonium acid fluoride [$NH_4F(HF)_x$] stream 6 flow rate and gas flow to the regenerator 200. The maximum stream 6 flow rate and the maximum gas flow to the regenerator 200 are achieved with no gas flow through the bypass line 30 from the reactor 100 to the demister 500, which is normally the preferred operating practice. Excessive bypass line 30 flow rates from the reactor 100 to the demister 500 can lead to a decrease in the elevation difference 120 between the reactor melt elevation 110 and regenerator melt elevation 210, which is undesirable.

A reactor product stream 7 is withdrawn from the reactor 100 and fed to a regenerator 200. The reaction product stream 7 comprises nitrogen trifluoride, hydrogen fluoride and nitrogen produced in the reactor 100, as well as entrained ammonium acid fluoride melt and small amounts of unreacted fluorine. The feed flux of the reactor product stream 7 is typically between about 0.1 and about 0.5 cubic meters per square meter of tank cross-sectional area per second. If needed, such as during start-up of the apparatus 10, a nitrogen stream 28 can be introduced into the reaction product stream 7.

The regenerator 200 may comprise the same type of agitated tank as the reactor 100. As with the reactor 100, the power input to the turbine or other stirring device is preferably greater than about 1 kilowatt per cubic meter of ammonium acid fluoride melt, more preferably greater than about 5 kilowatts per cubic meter of melt. As shown, the stirring device preferably includes an aeration impeller 220 and a riser 22 to direct the feed stream into the impeller.

Regenerator 200 is operated at a lower pressure than the reactor 100. Preferably, the operating pressure of the regenerator 200 is at least about 50 kPa lower than the operating pressure of the reactor 100. In one embodiment, the pressure of the regenerator 200 is about 5 to about 20 kPa. The low pressure of the regenerator 200 facilitates release of gaseous hydrogen fluoride from the entrained liquid ammonium acid fluoride that enters regenerator 200. The operating pressure differential between the reactor 100 and regenerator 200 is preferably achieved by elevating the regenerator 200 above the reactor 100, such that the pressure of the reactor 100 is the regenerator 200 pressure plus the liquid head pressure that results from the elevation difference. The required height difference 120 between the ammonium acid fluoride melt surface 210 in the regenerator 200 and the melt surface 110 in the reactor 100 needed to reach the desired pressure differential can be estimated using a typical ammonium acid fluoride melt specific gravity of 1.3. Minor adjustments to the ammonium acid fluoride melt inventory in the two tanks, 100 and 200, could be used to control the melt elevation 210 in the regenerator 200. In one embodiment, the elevation 120 is at least about 6 meters, more preferably at least about 8 meters. The operating temperature of the regenerator 200 is preferably no more than about 5° C. less than reactor 100.

A regeneration product stream 16 comprising nitrogen trifluoride, hydrogen fluoride, nitrogen and entrained ammonium acid fluoride is removed from the regenerator 200 and fed to a demister 500, wherein the entrained ammonium acid fluoride is recovered by counter-current contact with a makeup ammonium acid fluoride stream 9. As will be understood in the art, other types of equipment may be used to separate the entrained liquid from the product stream 16.

The makeup ammonium acid fluoride is produced in a second reactor 400, wherein a hydrogen fluoride stream 8 and an ammonia stream 2 are mixed and reacted to form the ammonium acid fluoride melt. Since the reaction is highly exothermic, a cool wall falling film reactor is preferred. Preferably, the melt acidity value of the ammonium acid fluoride stream 9 leaving the second reactor 400 is at least about 1.8, and more preferably at least about 2.0. Use of a relatively high melt acidity value for makeup stream 9 is advantageous because it rapidly decreases the temperature of the regenerator product stream 16, which minimizes nitrogen trifluoride decomposition. Additionally, higher melt acidity values will allow the second reactor 400 to be cooled with conventional 40° C. cooling water.

As noted above, ammonium acid fluoride melt from regenerator 200 is recycled to reactor 100 via stream 6. Preferably, the recycled ammonium acid fluoride passes through a gas-liquid separator 300, which provides a quiescent zone conducive for gas/liquid separation. The gaseous stream 20 from gas/liquid separator 300 is preferably combined with regenerator product stream 16 upstream of the demister 500 or fed directly to the demister. The primary purpose of the gas-liquid separator 300 is to create sufficient density difference between streams 6 and 7 so that the preferred ammonium acid fluoride flow rate in stream 6 is achieved. However, significant entrainment of gas in stream 6 can be tolerated in the present invention.

Following removal of the entrained ammonium acid fluoride, a gaseous product stream 10 is removed from the demister 500 and preferably fed through a series of process steps designed to separate the crude nitrogen trifluoride product from hydrogen fluoride. As shown, in one embodiment, the gaseous product stream 10 passes through a vacuum pump feed cooler 600. Preferably, the vacuum pump feed cooler 600 reduces the temperature of product stream 10 to less than about 50° C. The product stream 10 then passes through a vacuum pump 700, which preferably comprises a dry vacuum pump with inter-stage cooling. The discharge pressure of the vacuum pump 700 is preferably slightly greater than atmospheric pressure. Thereafter, the product stream 10 enters a gas-liquid separator 800, which is preferably equipped with a reflux condenser 900. The separator 800 comprises a gaseous stream outlet 26 and a liquid stream outlet 24. The crude nitrogen trifluoride stream 3 preferably contains less than about 1% of the hydrogen fluoride found in product stream 10. This can be achieved using a reflux condenser 900 temperature of about −30° C. The crude product stream 3 may then be purified to produce a salable product using purification techniques known in the art.

As noted in FIG. 1, the liquid outlet 24 of the separator 800 is in fluid communication with two hydrogen fluoride streams used in the process, 5 and 8, thereby allowing the recycle of hydrogen fluoride. In addition, a by-product hydrogen fluoride stream 4 may be removed from the process as needed.

The following procedure may be used to set the operating pressures of the reactor 100 and the regenerator 200 and to control the ammonium acid fluoride melt acidity value. As noted above, it is preferable to operate the reflux condenser 900 at a sufficiently low temperature to recover essentially all of the hydrogen fluoride from product stream 10. Both the ammonia feed stream 2 flow rate and the by-product hydrogen fluoride stream 4 flow rate can be estimated based on the fluorine feed 1 flow rate and the expected values of $c_1$, $c_2$, and $c_3$ in Reactions 4–6. Then, the pressure in the regenerator 200 may be set to provide reasonable stream 6 and 8 flow rates. As noted above, this generally results in a regenerator 200 pressure in the range of about 5–20 kPa. The periodic measurement of the ammonium acid fluoride melt acidity in either recycle stream 6, reactor product stream 7 or the reactor 100 or regenerator 200 melt inventory could be used to update the estimated values of $c_1$, $c_2$, and $c_3$ and the flow rates of streams 2 and 4. Since the hydrogen fluoride inventory in the reactor 100, regenerator 200 and interconnecting piping is large relative to the by-product stream 4 flow rate, even substantial errors in the estimates for the fluorine feed rate, ammonium feed rate or the values of $c_1$, $c_2$, and $C_3$ would result in a slow change in the ammonium acid fluoride melt acidity values in stream 6 and 7.

Tables 1–3 below provides a summary of exemplary stream properties for several of the labeled streams in FIG. 1.

TABLE 1

| | Stream Number | | | |
|---|---|---|---|---|
| Description | 1 | 2 | 3 | 4 |
| kg/hr | | | | |
| F2 (g) | 66.12 | — | 1.98 | — |
| NF3 (g) | — | — | 31.71 | — |
| N2 (g) | — | — | 3.25 | — |
| NH3 (g) | — | 11.56 | — | — |
| NH4HF2 (melt) | — | — | — | — |
| HF (g) | 1.30 | — | 1.38 | — |
| HF (1) | — | — | — | 40.65 |
| HF (melt) | — | — | — | — |
| Total, kg/hr | 67.42 | 11.56 | 38.33 | 40.65 |
| T, ° C. | 25.0° C. | 25.0° C. | −30.0° C. | −30.0° C. |
| P, kPa | 144 | 140 | 120 | 120 |
| x, $NH_4F(HF)_x$ | — | — | — | — |
| Average MW | 37.35 | 17.03 | 56.04 | 20.01 |

TABLE 2

| | Stream Number | | | |
|---|---|---|---|---|
| Description | 5 | 6 | 7 | 8 |
| k2/hr | | | | |
| F2 (g) | — | — | 1.98 | — |
| NF3 (g) | — | — | 31.71 | — |
| N2 (g) | — | — | 3.25 | — |
| NH3 (g) | — | — | — | — |
| NH4HF2 (melt) | — | 84,052.82 | 84,014.11 | — |
| HF (g) | 14.36 | — | 1.80 | — |
| HF (l) | — | — | — | 45.58 |
| HF (melt) | — | 14,650.88 | 14,732.62 | — |
| Total, kg/hr | 14.36 | 98,703.70 | 98,785.47 | 45.58 |
| T, ° C. | 25.0° C. | 126.0° C. | 130.0° C. | −30.0° C. |
| P, kPa | 144 | 120 | 148 | 120 |
| x, $NH_4F(HF)_x$ | — | 1.497 | 1.500 | — |
| Average MW | 20.01 | 44.75 | 44.70 | 20.01 |

TABLE 3

| | Stream Number | |
|---|---|---|
| Description | 9 | 10 |
| Kg/hr | | |
| F2 (g) | — | 1.98 |
| NF3 (g) | — | 31.71 |
| N2 (g) | — | 3.25 |
| NH3 (g) | — | — |
| NH4HF2 (melt) | 38.71 | — |
| HF (g) | — | 101.98 |

TABLE 3-continued

| | Stream Number | |
|---|---|---|
| Description | 9 | 10 |
| HF (1) | — | — |
| HF (melt) | 18.43 | — |
| Total, kg/hr | 57.14 | 138.92 |
| T, ° C. | 80.0° C. | 78.9° C. |
| P, kPa | 140 | 15 |
| X, $NH_4F(HF)_x$ | — | — |
| Average MW | 35.72 | 24.32 |

EXAMPLE 1

The data in FIG. 3 illustrates the usefulness of adding hydrogen fluoride to a fluorine feed. At the reactor operating conditions given in FIG. 3, the optimum melt acidity x value is about 1.7. The HF partial pressure of 35 kPa is equivalent to an initial effective melt acidity x value of about 1.8. The data in FIG. 3 show that the addition of HF to the $F_2$ feed dramatically decreases the adverse effect of bulk $NH_4F(HF)_x$ melt acidity x values less than the optimum value of 1.7. Above the optimum $NH_4F(HF)_x$ melt acidity x value, the addition of HF to the fluorine feed has a small effect on the relationship between the $NF_3$ conversion and the $NH_4F(HF)_x$ melt acidity value. The optimum performance would be achieved with the initial effective melt acidity value at the optimum bulk melt acidity value. However, one of the advantages of the present invention is that the user can select an initial effective melt acidity x value that is slightly greater than the optimum value and a bulk $NH_4F(HF)_x$ melt acidity value slightly below the optimum value and be assured that $NF_3$ production rate will be much less sensitive to changes in the optimum $NH_4F(HF)_x$ acid value due to undetected changes in reactor operating conditions or excursions in $NH_4F(HF)_x$ acidity value. In addition, the presence of HF in the fluorine feed also improves the reliability and operation of the sparger or other bubbling device by reducing the likelihood of blockage by ammonium acid fluoride.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of producing nitrogen trifluoride, comprising:

providing a fluorine-containing feed stream;

contacting the fluorine-containing feed stream with liquid ammonium acid fluoride in a series of reactors, wherein each successive reactor contains liquid ammonium acid fluoride having a lower bulk melt acidity value than that of the immediately preceding reactor; and removing a reaction product stream comprising nitrogen trifluoride from the last reactor in said series.

2. A method according to claim 1, wherein said bulk melt acidity value of the first reactor in said series is above the optimum value resulting in the highest nitrogen trifluoride yield and said bulk melt acidity value of the last reactor in said series is approximately the optimum value.

3. A method according to claim 1, wherein the fluorine-containing feed stream comprises elemental fluorine and hydrogen fluoride.

4. A method according to claim 1, wherein the ammonium acid fluoride has an acid-base stoichiometry of $NH_4M_y F_z (HF)_x$, wherein M is a metal selected from the group consisting of Group IA through VA, Group IB through VIIB and Group VIII of the Periodic Table of Elements or mixtures thereof y is 0–12; z is 1–12; and x is the melt acidity value.

5. A method according to claim 1, wherein the ammonium acid fluoride has an acid-base stoichiometry of $NH_4F(HF)_x$, wherein x is the melt acidity value.

6. A method of producing nitrogen trifluoride, comprising:

providing a gaseous mixture of elemental fluorine and hydrogen fluoride; feeding the gaseous mixture into a reaction zone containing a bulk ammonium acid fluoride; contacting the gaseous mixture with the bulk liquid ammonium acid fluoride for a time and under conditions sufficient to produce nitrogen trifluoride; and removing a reaction product stream comprising nitrogen trifluoride from the reaction zone.

7. A method according to claim 6, wherein in an area of said reaction zone where said gaseous mixture initially contacts said bulk liquid ammonium acid fluoride, the effective melt acidity value is at least about 0.05 greater than the melt acidity value of the bulk liquid ammonium acid fluoride in the rest of the reaction zone.

8. A method according to claim 6, wherein the bulk liquid ammonium acid fluoride melt acidity value is less than about 1.8.

9. A method according to claim 6, wherein the bulk liquid ammonium acid fluoride melt acidity value is less than about 1.6.

10. A method according to claim 6, wherein the bulk liquid ammonium acid fluoride melt acidity value is less than about 1.5.

11. A method according to claim 6, wherein the initial partial pressure of hydrogen fluoride in the gaseous mixture is at least about 15 kPa at the operating temperature and pressure of the reaction zone.

12. A method according to claim 6, wherein the initial partial pressure of hydrogen fluoride in the gaseous mixture is at least about 25 kPa at the operating temperature and pressure of the reaction zone.

13. A method according to claim 6, wherein the initial partial pressure of hydrogen fluoride in the gaseous mixture is at least about 40 kPa at the operating temperature and pressure of the reaction zone.

14. A method according to claim 6, wherein the operating temperature of the reaction zone is about 120 to about 150° C.

15. A method according to claim 6, wherein the operating pressure of the reaction zone is about 80 to about 200 kPa.

16. A method according to claim 6, wherein said contacting step occurs in a stirred tank reactor.

17. A method according to claim 6, wherein said reaction product stream comprising nitrogen trifluoride and entrained liquid ammonium acid fluoride; and said method further comprises the steps of:

introducing the reaction product stream into a regeneration zone, wherein the operating pressure of the regeneration zone is lower than the operating pressure of the reaction zone such that gaseous hydrogen fluoride is released from the entrained liquid ammonium acid fluoride;

removing a regeneration product stream from the regeneration zone, the regeneration product stream comprising nitrogen trifluoride and hydrogen fluoride;

introducing the regeneration product stream into a separation zone to separate hydrogen fluoride from nitrogen trifluoride;

recycling liquid ammonium acid fluoride from the regeneration zone to the reaction zone; and recycling at least a portion of the hydrogen fluoride separated in the separation zone for use in the gaseous mixture of elemental fluorine and hydrogen fluoride.

18. A method according to claim 17, wherein the reaction zone and the regeneration zone are located within separate stirred tank reactors.

19. A method according to claim 17, wherein the operating pressure of the reaction zone is at least about 50 kPa higher than the operating pressure of the regeneration zone.

20. A method according to claim 17, wherein the operating pressure of the regeneration zone is about 5 to about 20 kPa.

21. A method according to claim 17, wherein the regeneration zone is located at an elevation at least about 6 meters higher than the elevation of the reaction zone.

22. A method according to claim 17, wherein said step of recycling liquid ammonium acid fluoride from the regeneration zone to the reaction zone comprises:

passing liquid ammonium acid fluoride from the regeneration zone to a gas-liquid separation tank in order to separate a gas phase from the liquid ammonium acid fluoride;

combining the gas phase produced in the gas-liquid separation tank with the regeneration product stream; and passing liquid ammonium acid fluoride from the separation tank to the reaction zone.

23. A method according to claim 17, wherein the recycled liquid ammonium acid fluoride from the regeneration zone is mixed with the gaseous mixture of elemental fluorine and hydrogen fluoride prior to entry into the reaction zone.

24. A method according to claim 17, wherein the flow rate of the recycled liquid ammonium acid fluoride entering the reaction zone is at least about 1000 times the stoichiometric flow rate.

25. A method according to claim 24, wherein the flow rate of the recycled liquid ammonium acid fluoride entering the reaction zone is at least about 2000 times the stoichiometric flow rate.

26. A method according to claim 17, further comprising:

reacting ammonia with hydrogen fluoride in a second reaction zone under conditions sufficient to produce ammonium acid fluoride;

removing a liquid ammonium acid fluoride product stream from the second reaction zone; and introducing the ammonium acid fluoride product stream into the regeneration zone.

27. A method according to claim 26, further comprising:

contacting the liquid ammonium acid fluoride product stream from the second reaction zone with the regeneration product stream from the regeneration zone in order to remove entrained ammonium acid fluoride from the regeneration product stream.

28. A method according to claim 27, wherein said step of contacting the ammonium acid fluoride product stream from the second reaction zone with the regeneration product stream from the regeneration zone comprises contacting the ammonium acid fluoride product stream and the regeneration product stream in a demister.

29. A method according to claim 26, wherein at least a portion of the hydrogen fluoride separated in the separation zone is recycled for reaction with the ammonia in the second reaction zone.

30. A method according to claim 17, wherein at least a portion of the hydrogen fluoride separated in the separation zone is collected in a byproduct stream.

* * * * *